Figure 1:
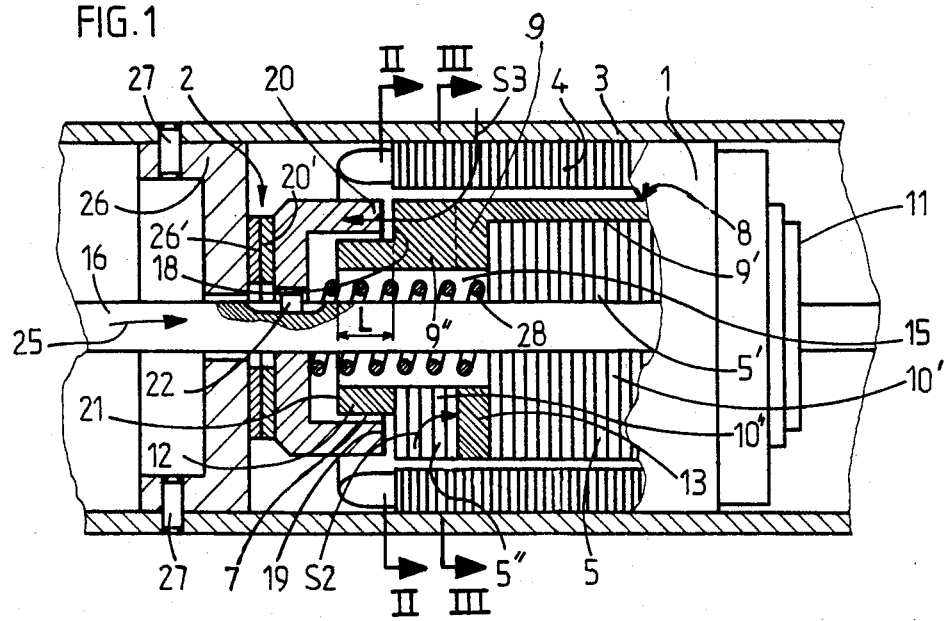

United States Patent [19]

Plumer

[11] Patent Number: 4,720,647
[45] Date of Patent: Jan. 19, 1988

[54] BRAKE MOTOR

[76] Inventor: Louis Plumer, Les Mélèzes 4, rue des Artisans, 74300 Cluses, France

[21] Appl. No.: 709,426

[22] Filed: Mar. 7, 1985

[30] Foreign Application Priority Data

Mar. 27, 1984 [FR] France .................................. 84 04739

[51] Int. Cl.$^4$ ............................................. H02K 7/16
[52] U.S. Cl. ...................................... 310/77; 310/211
[58] Field of Search ....................... 310/77, 92, 93, 96, 310/211, 212, 209

[56] References Cited

U.S. PATENT DOCUMENTS

| | | | |
|---|---|---|---|
| 2,793,306 | 5/1957 | Bolech | 310/77 |
| 3,032,667 | 5/1962 | Sorchy | 310/77 |
| 3,535,568 | 10/1970 | Haverkamp | 310/77 |
| 3,683,217 | 8/1972 | Agalakov et al. | 310/77 |
| 3,965,380 | 6/1976 | Stepina | 310/77 |

Primary Examiner—Mark O. Budd

[57] ABSTRACT

The present invention relates to an asynchronous motor having a squirrel-cage rotor, associated with a brake operating in the absence of current. The rotor comprises, at its two opposite ends, first and second short-circuiting rings and an intermediate short-circuiting ring, all three being made from non-magnetic material and being connected by longitudinal rotor windings. The intermediate ring extends radially from the outer diameter of the rotor as far as a cylindrical recess provided axially between the second ring and the intermediate ring. It is provided in order to separate a part of the rotor, intended to deflect the corresponding part of the radial stator field towards the moveable plate of the brake. This moveable plate has a radial face arranged opposite segments of magnetic material arranged radially between the periphery of the second ring and the outer diameter of the rotor. The second ring extends radially as far as the recess. A spring, housed in the recess, tends to press the movable plate constantly against a fixed plate, by moving it away from the rotor.

4 Claims, 3 Drawing Figures

BRAKE MOTOR

The present invention relates to a brake motor comprising an asynchronous motor with a squirrel-cage rotor, the rotor comprising on the one hand, at its opposite ends, respectively first and second short-circuiting rings of non-magnetic material connected by the rotor windings, the second short-circuiting ring extending radially from the cylindrical recess towards the outside, leaving between the periphery of the second short-circuiting ring and the outer diameter of the rotor, ring segments of magnetic material whereof the radial face is arranged opposite the radial face of the moveable brake plate, on the other hand an intermediate short-circuiting ring, of non-magnetic material, separating a part of the rotor, intended to deflect the corresponding part of the radial stator field, in the direction of the moveable plate of the brake, this moveable plate whereof one substantially radial face is arranged opposite the radial end of the rotor, being connected to rotate with the rotor and able to move axially on the rotor shaft in order to move away from the fixed brake plate, against the action of a spring, a cylindrical recess extending axially from the second ring at least as far as the intermediate ring, the rotor windings between these two rings extending radially from the outer diameter of the rotor as far as the cylindrical recess.

In a known brake motor of this type, such as that described in French Patent No. 1 532 298, the second non-magnetic short-circuiting ring is arranged radially at a very small, but not non-existant distance from the periphery of the rotor and, with the intermediate short-circuiting ring and the longitudinal rotor windings, it constitutes a succession of short-circuiting turns distributed uniformly around the rotor inside the latter. When the motor is started-up under full load, the result is that the magnetic circuit passing between the periphery of the rotor and the periphery of the second ring is saturated and the major part (approximately 85%) of the magnetic flux (F2) deflected towards the moveable plate is out of phase relative to the stator field, whilst making a contribution to the driving torque. The majority of the magnetic flux of the part of the rotor separated by the intermediate ring, is thus applied to an area of the moveable plate of the brake, of relatively small diameter and is not used as a whole for attracting the moveable plate of the brake, which is a drawback when one is attempting to obtain an attraction force which is as high as possible.

On the other hand, the intermediate short-circuiting ring extends radially from the outer diameter of the rotor solely over part of the radius of the latter. The two parts of the rotor, separated by this intermediate ring, are thus not completely separated magnetically and, at the time when the supply of power to the stator is interrupted, a brief and considerable current is created in this stator, which instantaneously generates in the rotor, due to the transformation effect, an even greater current in the rotor windings. An intense magnetic field is thus created in the magnetic plates constituting the rotor, which is a drawback from the point of view of operation of the brake, since the plates, in particular those which are close to the brake are highly magnetised, which causes a residual field in these plates, thus a force holding the moveable plate of the brake for a certain period of time (1 to 2 seconds) after the supply of power to the motor has been interrupted. This impairs the instantaneous operation of the brake and prevents an instantaneous immobilisation of the load, in particular at the time of the descent of the latter and there is a danger of causing progressive deterioration of the brake linings of the fixed and moveable plates, resulting from the sudden friction and heating of these linings which come into contact with a delay at an instant when the relative speed of the two plates is already very high.

In another known embodiment (French Patent No. 1.181.434), the second short-circuiting ring extends radially from a cylindrical recess, towards the outside, leaving segments of rings of magnetic material between the periphery of this ring and the outer diameter of the rotor. The outer ring of the moving armature working with these magnetic segments is however sized in order to be saturated, which is the same as if the magnetic segments were saturated. In fact attempts have been made to limit the flux passing through the outer pole face of the moveable armature to the value necessary for producing the attraction force, in order to have a greater starting torque. This was all the more necessary if the intermediate ring was not conducting and if the residual magnetic field in the plates of the rotor after interrupting the supply of power to the motor, is considerable. This brake motor thus has the same drawbacks as the prior art previously mentioned.

The object of the present invention is to allow the construction of a brake motor not having the drawbacks of the prior art cited, in which, at the time of startingup under load, the maximum magnetic flux deflected in the rotor towards the moveable plate of the brake is used to attract this plate so that the attraction force and thus the braking force are as high as possible and in which, when the supply of power to the motor is interrupted, no residual magnetic field remains in the plates of the rotor, close to the moveable plate of the brake, so that this plate may instantaneously move away from the rotor and lie flat against the fixed plate of the brake, in order to immobilise the load without delay whilst consequently preventing any risk of abnormal deterioration of the linings of these plates.

The brake motor according to the invention is characterised in that the intermediate short-circuiting ring extends radially from the outer diameter of the rotor at least as far as the cylindrical recess and that the radial section of the said ring segments is sufficient so that these segments are never saturated when the motor startsup.

According to an interesting embodiment in particular in the case where stacks of magnetic plates are arranged on the one hand between the first ring and the intermediate ring, on the other hand between the latter and the second ring, the radial face of the ring segments of magnetic material is arranged to be set back with respect to the radial face of the second short-circuiting ring, by a distance measured axially at least equal to the thickness of this second ring and the moveable plate of the brake has its active radial face, which is offset by a distance at least equal to the thickness l, in front of the remainder of the said plate in the direction of the radial face of the segments, solely opposite the said radial face. According to another interesting embodiment, in particular when the part of magnetic material situated between the intermediate ring and the second ring is constituted by a solid material, the radial face of the segments of magnetic material is moved forwards in the same plane as the radial face of the second ring and the radial face of the moveable plate is possibly moved back accordingly.

The accompanying drawings illustrate, by way of example, one embodiment according to the present invention.

Figure 2:
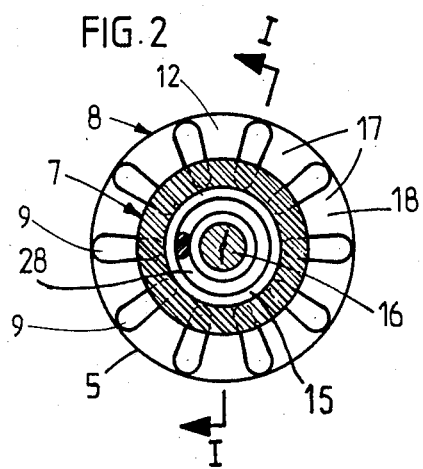
Figure 3:
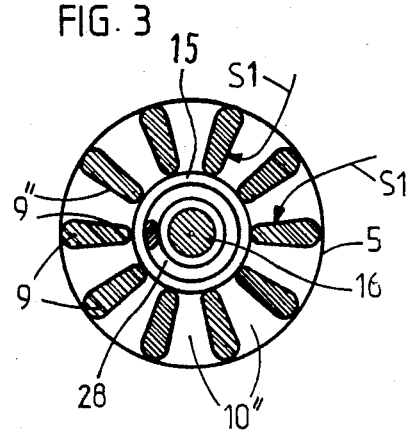

FIG. 1 shows this embodiment of a brake motor seen partly in longitudinal section on line I—I of FIG. 2, FIG. 2 shows the rotor of the same embodiment in section on line II—II of FIG. 1, FIG. 3 shows the rotor of the same embodiment in section on line III—III of FIG. 1.

As illustrated in FIGS. 1 to 3, the brake motor comprises an asynchronous motor 1 associated with a brake 2 operating in the absence of current. In this example, both are housed end to end in a tube 3 serving as a casing and also able to contain a speed-reduction unit and automatic stopping devices operating at a certain number of revolutions, not illustrated in the drawing etc. A brake motor of this type, generally of relatively small outer diameter (less than 90 mm for example) is intended in particular to be housed in the winding tube of a roller blind, rolling shutter, shop grille etc.

The motor 1 is an asynchronous motor which may be three-phase or single-phase. In this example it is a single-phase motor with capacitor. This motor 1 comprises a stator 4 whereof the outer dimensions correspond to the inner dimensions of the tube 3 and a squirrel-cage rotor 5. At its two opposite ends, this rotor comprises respectively first and second short-circuiting rings 11, 12 of non-magnetic conducting material, connected by rotor windings 9 extending longitudinally. It also comprises an intermediate short-circuiting ring 13, also of non-magnetic conducting material, which separates a second part 5" from a first part 5' of the rotor. These two parts 5' and 5" are in this example constituted by stacked magnetic plates respectively 10' and 10", arranged respectively between the first ring 11 and the intermediate ring 13 and between the latter and the second ring 12. In the first part 5' of the rotor 5, the first respective parts 9' of the rotor windings 9 are constituted by bars of relatively small section, extending flush with the outer diameter 8 of the rotor 5. In the second part 5" of the rotor 5, the respective second parts 9" of the rotor windings 9 extend radially from the outer diameter 8 of the rotor as far as a cylindrical recess 15 which extends axially from the outer radial face 21 of the second ring 12 as far as the face of the intermediate ring 13 which is in contact with the magnetic plates 10'. The cylindrical recess 15 is concentric with the shaft 16 of the rotor.

The intermediate ring 13 extends radially from the outer diameter 8 of the rotor 5 as far as the cylindrical recess 15, in this example. The second short-circuiting ring 12 extends radially from the cylindrical recess 15, towards the outside, leaving between the periphery 7 of this second short-circuiting ring 12 and the outer diameter 8 of the rotor 5, ring segments 17 of magnetic material (FIG. 2) constituted by stacked plates 10". In one embodiment, the outer diameter 8 of the rotor is equal to 33.5 mm, the outer diameter 7 of the second ring 12 is equal to 27.5 mm and the inner diameter of the recess 15 is equal to 21.5 mm. In this case, the ratio between the total radial section of the segments 17 of non-magnetic material and the cross section of the rotor 5, reduced by that of the cylindrical recess 15, is substantially equal to 0.3. Depending on the possible variation of certain dimensions, without diverging from the scope of the present invention, this ratio may itself vary whilst remaining equal to or greater than 0.2.

The radial face 18 of the segment 17 is arranged opposite the radial face 19 of the moveable plate 20 of the brake 2, which plate is arranged concentrically with respect to the shaft 16. In this example, the radial face 18 of the ring segment 17 of magnetic material is arranged to be set back (FIG. 1) with respect to the outer radial face 21 of the second short-circuiting ring 12, by a distance measured axially at least equal to the thickness L of this second ring 12. The moveable plate 20 of the brake 2 itself has its active radial face 19, which is offset by a distance equal to L, in front, according to arrow 25, of the remainder of the said plate 20 in the direction of the radial face 18 of the segment 17, solely opposite the said radial face 18.

The moveable plate 20 is connected to rotate with the shaft 16 of the rotor 5 by way of a cotter pin 22 and it is able to move axially in the direction of arrow 25 (FIG. 1) on the shaft 16 of the rotor 5 in order to move away from the fixed plate 26 of the brake 2, against the action of a spring, for example a compression spring 28 arranged co-axially with respect to the shaft 16 in the cylindrical recess 15. Without diverging from the scope of the present invention, this compression spring 28 could be replaced by one or more traction springs or the like, arranged outside the recess 15.

The fixed plate 26, which is also arranged concentrically with respect to the shaft 16, is rendered integral with the inner periphery of the tube 3, for example by transverse cotter pins 27. The fixed plate 26 and the moveable plate 20 comprise, on their respective opposed faces, brake linings 26' and 20' intended to co-operate with each other when the supply of power to the motor is interrupted.

In the present embodiment, the three short-circuiting rings 11, 12 and 13 as well as the two parts 9' and 9" of the rotor windings 9, are advantageously constituted by a non-magnetic, conducting material, such as aluminium, moulded in one piece on the stacked magnetic plates 10' and 10" whereof the two stacks are previously spaced apart by a distance equal to the desired thickness for the intermediate ring 13.

When the motor starts-up, for example in a direction causing the descent of the load, at the instant when power is supplied to the stator 4, the current circulating in this stator creates a radial field which is a rotating or pulsating or pulsating rotating field, depending on whether the power supply is three-phase, single-phase or single-phase with a capacitor as in the present example.

In the first part 5' of the rotor 5, this radial field intersects the rotor windings 9' which are the seat of a considerable induced current which flows through the first short-circuiting ring 11 and through the intermediate short-circuiting ring 13. This induced current creates a rotor field and the force which results from the various fields causes the rotation of the rotor. The current induced in this first part 5' cannot be deflected axially towards the second part 5" of the rotor on account of the presence of the intermediate ring 13.

In the second part 5" of the rotor 5, the radial stator field cannot create in the rotor a flux causing the rotation of this rotor. In fact, no magnetic flux is able to pass radially through the rotor 5 on account of the presence of the cylindrical recess 15. Neither is the flux able to skirt in a circular manner in the direction of arrow S1 (FIG. 3) around this recess 15 on account of the presence of the rotor windings 9" which extend from the outer diameter 8 as far as this recess 15 and thus cannot intersect these windings 9". Neither can the flux be deflected axially in the direction of arrow S2 (FIG. 1) towards the first part 5' of the rotor, on account of the presence of the intermediate short-circuiting ring 13, nor be deflected axially in the immediate vicinity of the spring 28 in the direction of the moveable plate 20 on account of the presence of the second short-circuiting ring 12. The entire magnetic flux coming radially from the field of the stator 4 may solely be deflected axially in the direction of arrow S3 (FIG. 1) through the magnetic segments 17 outside the periphery 7 of the second short-circuiting ring 12, in the direction of the active radial face 19 of the moveable plate 20 of the brake, without the segments 17 ever being saturated. The entire magnetic stator flux thus combines to attract the moveable plate 20, in the direction of arrow 25, against the action of the spring 28 (FIG. 1), in the direction of the segments 17, the attraction force being maximum since the magnetic flux is concentrated in an annular region of relatively great diameter. This attraction takes place instantaneously as soon as the stator 4 is supplied with power. When the linings 26' and 20' move away from each other, the brake 2 no long fulfils its function and the rotor 5 is able to entrain the load in rotation.

As long as the stator 4 is supplied with power during the descent of the load, the attraction force exterted on the moveable plate 20 remains substantially identical to the attraction force which existed at the time of starting-up. In fact, this attraction force depends solely on the stator field and not on a rotor field linked with the speed of rotation of the rotor 5.

At the instant when the supply of power to the stator 4 is interrupted, the moveable plate is immediately released and lies flat against the fixed plate 26 in order to immobilise the load entrained hitherto by the motor. In fact, at this instant, a brief and considerable current is generated in the stator 4, but virtually no current is generated in the second part 5" of the rotor 5, owing to the presence of the intermediate shortcircuiting ring 13 which shunts the existing currents in the rotor windings 9' of the first part 5' of the rotor and also because, as mentioned previously, the flux coming from the stator field cannot pass radially through the second part 5" of the rotor. There is thus no rotor flux magnetising the plates 10" of the second part 5" at the instant when the power is cut off. Just after the power is cut off, there is no residual magnetic flux in these plates 10" and no attraction force keeps the moveable plate 20 away from the fixed plate 26. On the other hand, also on account of the presence of the intermediate short-circuiting ring 13, the residual magnetism of the plates 10' of the first part 5' of the rotor cannot be transmitted to the plates 10" of the second part 5" close to the moveable plate 20.

In the case where the power supplied to the stator is single-phase with a capacitor, after cutting off the power supply, the latter certainly maintains a parasite supply in the stator 4, due to its stored energy, but the transitory stator field resulting is insufficient to retain the moveable plates 20 in the absence of a residual field in the second part 5" of the rotor 5.

Without diverging from the scope of the present invention, the intermediate short-circuiting ring 13 could extend radially from the outer diameter 8 of the rotor 5 as far as the shaft 16 and the cylindrical recess 15 could extend axially as far as the intermediate ring 13, instead of being extended as far as the plates 10'. Similarly, the radial face 18 of the magnetic segments 17 could be moved forwards in the same plane as the radial face 21 of the second ring 12, the radial face 19 of the moveable plate 20 possibly being moved back accordingly. The operation of the brake motor arrangement would remain unchanged.

The present invention can be used in particular for producing a tubular speed-reduction unit, of relatively small diameter (less than 90 mm) intended to be housed in particular in the winding tube of a device for protection against the sun, a closure device or a winch.

What is claimed is:

1. A brake motor comprising:
   an asynchronous motor having a squirrel-cage rotor with first and second ends, a first shorting ring disposed at said first end, a second shorting ring disposed at second end, magnetic ring segments extending between said first and second shorting rings, an intermediate shorting ring disposed between said first and second shorting rings for dividing said rotor into a first and a second rotor parts, the ring magnets of the second part being unsaturated when a starting current is applied to the motor; said first, second and intermediate rings being non-magnetic; said rotor having an axial bore extending through said second shorting ring said second rotor part and said intermediate ring; said rotor having an annular rotor face at said second end;
   said motor further comprising a stator disposed around said rotor for generating a first magnetic field corresponding to said first rotor part for the rotation of the rotor, and a second magnetic field corresponding to said second rotor part; and a shaft holding said rotor;
   a fixed brake plate; and
   a rotary brake plate disposed
   on said shaft, said rotary brake plate being axially movably disposed between said fixed brake plate and said second rotor end, and having a brake annular face opposite said rotor annular face;
   a spring disposed within said bore for urging said rotary brake plate against said fixed brake plate;
   said rotary brake plate being pulled away from said fixed brake plate by said second magnetic field when electric current is applied to said motor;
   said second shorting ring, intermediary shorting ring and bore cooperating to direct said second magnetic field axially toward said annular faces.

2. A brake motor according to claim 1, in which the annular rotor face is set back with respect to an annular face of the second ring by a distance measured axially at least equal to the thickness of the second ring, and the brake plate annular face being offset by a distance at least equal to the thickness of the second ring from a remainder of said plate in the direction of the rotor and being solely opposite the rotor annular face said brake plate annular face being connected to said remainder by a cylindrical extension which envelops said second ring.

3. A brake motor according to claim 1 in which the ratio between the total radial section of the segments and the cross section of the rotor, decreased by that of the cylindrical bore, is equal to or greater than 0.20.

4. The brake motor of claim 2 wherein said cylindrical extension is disposed radially outwardly of said second ring, and said second ring extends radially between said bore and said extension.

* * * * *